United States Patent
Sato

(10) Patent No.: US 11,435,949 B2
(45) Date of Patent: Sep. 6, 2022

(54) INFORMATION PROCESSING APPARATUS AND METHOD FOR CALCULATING A DATA SIZE ESTIMATED TO BE WRITTEN TO A STORAGE BASED ON A WRITE DATA SIZE

(71) Applicant: CANON KABUSHIKI KAISHA, Tokyo (JP)

(72) Inventor: Yoshikazu Sato, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 16/780,756

(22) Filed: Feb. 3, 2020

(65) Prior Publication Data
US 2020/0264807 A1 Aug. 20, 2020

(30) Foreign Application Priority Data
Feb. 15, 2019 (JP) .............................. JP2019-025606

(51) Int. Cl.
*G06F 3/06* (2006.01)
*G06F 12/02* (2006.01)
(52) U.S. Cl.
CPC .......... *G06F 3/0659* (2013.01); *G06F 3/0604* (2013.01); *G06F 3/0634* (2013.01); *G06F 3/0653* (2013.01); *G06F 3/0679* (2013.01); *G06F 3/0601* (2013.01); *G06F 3/0638* (2013.01); *G06F 12/023* (2013.01); *G06F 12/0238* (2013.01)
(58) Field of Classification Search
CPC .... G06F 3/0659; G06F 3/0634; G06F 3/0679; G06F 3/0653; G06F 3/0601; G06F 3/0604; G06F 3/0638; G06F 12/023; G06F 12/0238; G06F 3/0616

See application file for complete search history.

(56) References Cited

U.S. PATENT DOCUMENTS

| | | | |
|---|---|---|---|
| 7,262,875 B2* | 8/2007 | Hino | G06F 8/61 358/1.15 |
| 8,402,246 B1* | 3/2013 | de la Iglesia | G06F 3/0605 711/201 |
| 10,296,260 B2* | 5/2019 | Duzly | G06F 12/0246 |
| 2007/0285820 A1* | 12/2007 | Morita | H04N 9/8227 360/48 |
| 2011/0225434 A1* | 9/2011 | Nishikawa | G06F 1/24 713/300 |
| 2013/0132641 A1* | 5/2013 | Suzuki | G06F 12/0246 711/103 |

(Continued)

FOREIGN PATENT DOCUMENTS

JP 2015-198377 A 11/2015

*Primary Examiner* — Reginald G Bragdon
*Assistant Examiner* — Sakhr A Aldaylam
(74) *Attorney, Agent, or Firm* — Canon U.S.A., Inc. IP Division

(57) ABSTRACT

An information processing apparatus includes a storage unit configured to store data, a write control unit configured to instruct the storage unit to write data, a calculation unit configured to calculate, for each of a plurality of writes of data to the storage unit, a data size estimated to be actually written to the storage unit, based on a write data size specified by the write control unit, and a notification unit configured to issue a notification based on a total of the data sizes calculated by the calculation unit.

22 Claims, 16 Drawing Sheets

(56) References Cited

U.S. PATENT DOCUMENTS

| | | | |
|---|---|---|---|
| 2013/0265604 A1* | 10/2013 | Yokoyama | H04N 1/00896 |
| | | | 358/1.14 |
| 2014/0129758 A1* | 5/2014 | Okada | G06F 12/0246 |
| | | | 711/103 |
| 2014/0281168 A1* | 9/2014 | Koseki | G06F 3/0689 |
| | | | 711/103 |
| 2016/0041793 A1* | 2/2016 | Nagai | G06F 3/0616 |
| | | | 711/103 |
| 2017/0068457 A1* | 3/2017 | Sunaga | G06F 11/2094 |
| 2018/0018231 A1* | 1/2018 | Okada | G06F 3/064 |
| 2018/0039450 A1* | 2/2018 | Ito | G06F 13/102 |
| 2018/0076833 A1* | 3/2018 | Akamine | G06F 13/24 |
| 2018/0107593 A1* | 4/2018 | Ogawa | G06F 12/0802 |

* cited by examiner

FIG.2

| | | WAF MANAGEMENT TABLE | | |
|---|---|---|---|---|
| No. | MANUFACTURER ID (1 BYTE) | PRODUCT NAME (6 BYTES) | HOST WRITE DATA SIZE | WAF |
| 001 | 0xCC | 0x123456789ABC | 4K BYTES | 4.0 |
| 002 | 0xCC | 0x123456789ABC | 8K BYTES | 2.0 |
| 003 | 0xCC | 0x123456789ABC | 16K BYTES | 1.0 |
| 004 | 0xCC | 0x123456789ABC | 32K BYTES | 1.0 |
| 005 | 0xCC | 0x123456789ABC | 64K BYTES | 1.0 |
| 006 | 0xEE | 0x567891234DEF | 4K BYTES | 8.0 |
| 007 | 0xEE | 0x567891234DEF | 8K BYTES | 4.0 |
| 008 | 0xEE | 0x567891234DEF | 16K BYTES | 2.0 |
| 009 | 0xEE | 0x567891234DEF | 32K BYTES | 1.0 |
| 010 | 0xEE | 0x567891234DEF | 64K BYTES | 1.0 |

200　201　202　203　204

INFORMATION PROCESSING APPARATUS AND METHOD FOR CALCULATING A DATA SIZE ESTIMATED TO BE WRITTEN TO A STORAGE BASED ON A WRITE DATA SIZE

BACKGROUND

Field

The present disclosure relates to an information processing apparatus and a method for controlling the information processing apparatus.

Description of the Related Art

In recent years, some information processing apparatuses are provided with an embedded Multi Media Card (eMMC), a Solid State Drive (SSD), and other NAND flash memories as auxiliary storage devices.

In a NAND flash memory, the write data size specified by a host system may differ from the data size actually written to the NAND flash memory (hereinafter this data size is referred to as an actual write data size), depending on a state where new data is written. An operation for writing data to the NAND flash memory is performed in page units (for example, in 4 K-byte units). Meanwhile, an operation for erasing data from the NAND flash memory is performed in block units (for example, in 64 K-byte units) where each block includes a plurality of pages. When writing new data to a page in which data has already been written, the NAND flash memory erases the entire block including the page and writes the new data together with the erased data. For this reason, the actual write data size for the NAND flash memory is larger than the write data size specified by the host system. The ratio of the actual write data size for the NAND flash memory to the write data size specified by the host system is referred to as a Write Amplification Factor (WAF).

For example, when the host system writes 2 K-byte data, 62 K-byte data may be written to the data write target block. In this case, the 62 K-byte data that has already been written is erased, and 64 K-byte data (the 62 K-byte data plus 2 K-byte data) is written to the NAND flash memory. In the above-described case, the WAF is 31.

The eMMC which is a built-in memory as a NAND flash memory does not memorize the actual write data size for the NAND flash memory. Therefore, the host system cannot acquire the actual data size written to the NAND flash memory and therefore cannot know how much data has been written to the NAND flash memory of the eMMC.

Japanese Patent Application Laid-Open No. 2015-198377 discusses a technique for multiplying a write data size specified by a host apparatus within a predetermined time period by the WAF to estimate the amount of write data within the predetermined time period.

SUMMARY

According to an aspect of the present disclosure, an information processing apparatus includes a storage unit configured to store data, a write control unit configured to instruct the storage unit to write data, a calculation unit configured to calculate, for each of a plurality of writes of data to the storage unit, a data size estimated to be actually written to the storage unit, based on a write data size specified by the write control unit, and a notification unit configured to issue a notification based on a total of the data sizes calculated by the calculation unit.

Further features of the present disclosure will become apparent from the following description of exemplary embodiments with reference to the attached drawings.

BRIEF DESCRIPTION OF THE DRAWINGS

FIG. 2 is a table illustrating an example of a configuration of a Write Amplification Factor (WAF) management table according to the first and the second exemplary embodiments.

DESCRIPTION OF THE EMBODIMENTS

Exemplary embodiments of the present disclosure will be described below with reference to the accompanying drawings. The exemplary embodiments will be described below centering on an image forming apparatus as an example of an information processing apparatus. An information processing apparatus other than an image forming apparatus, such as a computer and a tablet terminal, may perform the following processing.

Figure 1:
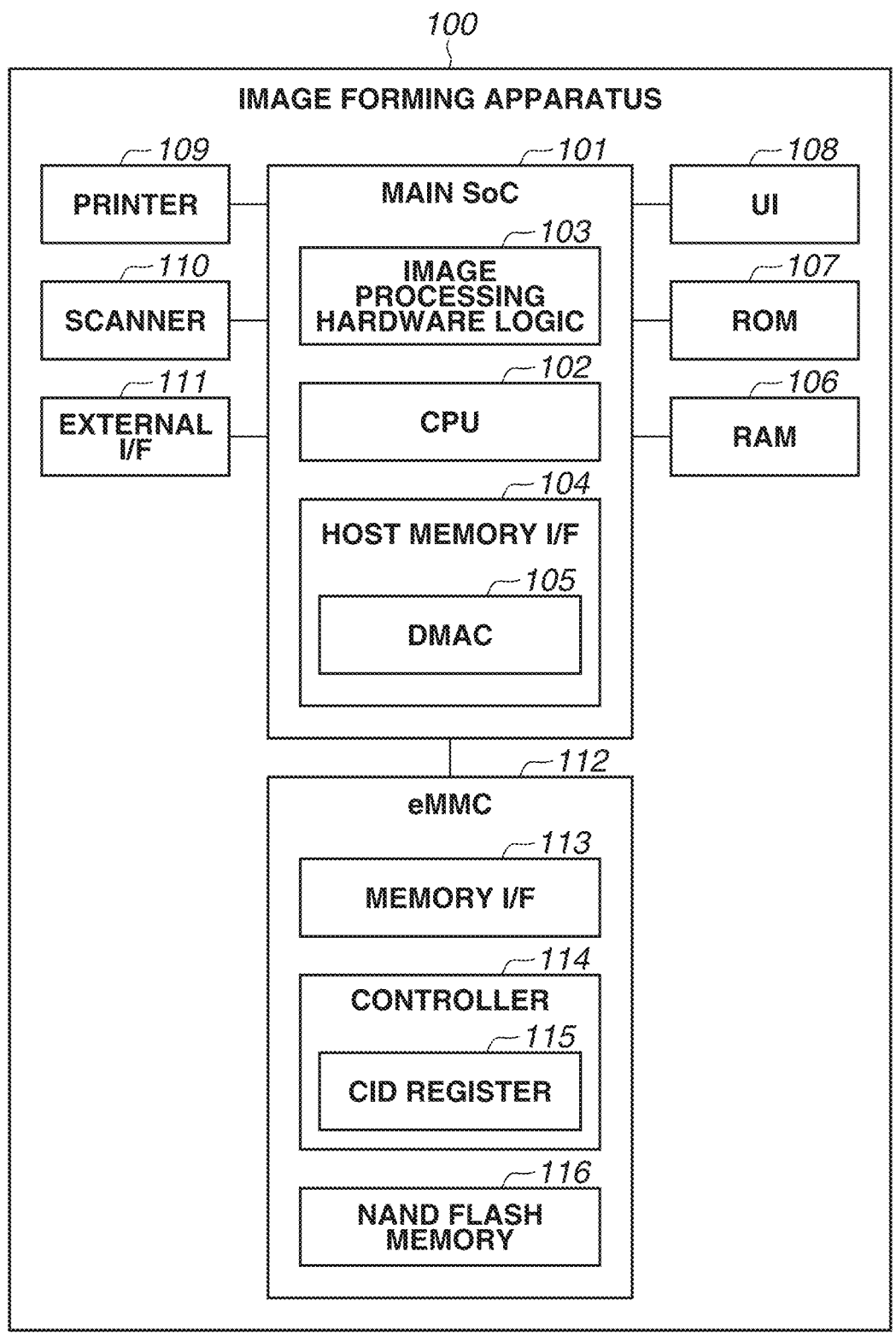
FIG. 1 is a diagram illustrating an example of a configuration of an image forming apparatus according to a first and a second exemplary embodiment.

FIG. 1 illustrates a configuration of an image forming apparatus 100 according to a first exemplary embodiment.

A main System on a Chip (SoC) 101 as an integrated circuit component includes a central processing unit (CPU) 102, an image processing hardware logic 103, and a memory interface (I/F) 104. The main SoC 101 also includes control interfaces for a random access memory (RAM) 106, a read only memory (ROM) 107, and a user interface (UI) 108, and a system bus for connecting these interfaces. However, these interfaces are not directly related to the present disclosure and therefore are not illustrated in FIG. 1.

The CPU 102 is a central processing unit for controlling the entire image forming apparatus 100.

The image processing hardware logic 103 performs image processing on input image data read from a scanner 110. More specifically, the image processing hardware logic 103 corrects, processes, and edits the input image data. The image processing hardware logic 103 further performs color conversion, filtering, resolution conversion, and other processing on output image data to be output to a printer 109 by the main SoC 101.

The host memory I/F 104 is a memory interface including a Direct Memory Access Controller (DMAC) 105. The CPU 102 controls the DMAC 105 to enable performing data input/output operations between an embedded Multi Media Card (eMMC) 112 and the RAM 106.

The RAM 106, which is a system work memory required for the operation of the CPU 102, stores calculation data of the CPU 102 and various programs. The RAM 106 is also used as an image memory for storing image data having undergone various image processing by the image processing hardware logic 103, at the time of scanning and printing.

The ROM 107 is a boot ROM which stores the boot program of the image forming apparatus 100.

The UI 108 is a user interface including a liquid crystal display for displaying screens and a touch panel and hardware keys for accepting inputs from a user.

The printer 109 includes a printer engine for printing image data on paper, a laser scanner unit, photosensitive drums, and a paper conveyance unit.

The scanner 110 scans images and texts on paper by using a charge coupled device (CCD) sensor and a contact image sensor (CIS) and converts images and texts into image data.

An external I/F 111 includes interfaces for a telephone network, wired local area network (LAN), wireless LAN, and universal serial bus (USB). The image forming apparatus 100 performs data communication with external apparatuses via these interfaces.

The eMMC 112 includes a memory i/F 113, a controller 114, and a NAND flash memory 116.

The memory I/F 113 is an interface for performing data input/output operations between the main SoC 101 and the controller 114 under the control of the controller 114.

The controller 114 is a memory control module that interprets a command received from the main SoC 101 via the memory I/F 113 and performs the operation corresponding to the command. The controller 114 further includes a Card IDentification number (CID) register 115. The CID register 115, which is a register defined by a standard stipulated by Joint Electron Device Engineering Councils (JEDEC), is an abbreviation of a Card IDentification number register. The CID register 115 includes such information as a manufacture identifier (ID) indicating a device maker and a product name for identifying a device.

The NAND flash memory 116 is a nonvolatile NAND flash memory for recording data. Data is written to the NAND flash memory 116 when electrons are injected into the floating gate of a memory cell in the NAND flash memory 116 under the control of the controller 114. Image data having been processed by the image processing hardware logic 103 is written to the NAND flash memory 116. Data is written to the NAND flash memory 116 in page units. Data is erased from the NAND flash memory 116 in block units where each block includes a plurality of pages. When writing data from the middle of a page, the controller 114 once saves data of the block including the page to other memory and then erases data for each block. Then, the controller 114 writes new write data together with the originally written data of the block, to the NAND flash memory 116. Since the controller 114 performs the above-described processing, in the NAND flash memory, the write data size specified by the CPU 102 via the DMAC 105 differs from the data size to be actually written to the NAND flash memory 116 by the controller 114.

FIG. 2 illustrates a Write Amplification Factor (WAF) management table for managing the WAF for estimating the amount of the data to be actually written to the NAND flash memory 116 when the main SoC 101 writes data to the NAND flash memory 116 according to the first exemplary embodiment.

The WAF management table illustrated in FIG. 2 is stored in the eMMC 112. The WAF management table stores the estimated numerical value of the WAF for each write data size that can be specified by the main SoC 101. According to the exemplary embodiment, the main SoC 101 estimates the actual write data size for the NAND flash memory 116 by using the WAF stored in the WAF management table. The WAF management table stores the WAF for each data size for a plurality of types of eMMCs. This is intended to acquire numerical values of WAF by using the WAF management table illustrated in FIG. 2 without generating new WAF management tables even when using different types of eMMCs 112. It is sufficient that a WAF management table for different types of eMMCs 112 is stored. In this case, a manufacture ID 201 and a product name 202 may not be provided but only the WAF for the write data sizes of the host system may be stored.

The WAF changes according to the write data size specified by the main SoC 101 and the amount of data currently stored in the NAND flash memory 116. Therefore, the WAF stored in the WAF management table is a numerical value for obtaining the data size estimated to be actually written to the NAND flash memory, based on the write data size specified by the main SoC 101. The WAF stored in the WAF management table may be a value defined by the manufacturer of the eMMC.

The value of the WAF generally increases with decreasing write data size. Therefore, referring to the WAF management table illustrated in FIG. 2, the WAF setting increases with decreasing write data size specified by the main SoC 101.

The WAF also depends on the size of a block as a unit which is used when the NAND flash memory 116 erases data. The block size depends on the device maker and the device for the same maker. Therefore, the WAF management table illustrated in FIG. 2 stores WAF for each manufacture ID indicating the device maker and for each product name indicating the device.

An item "No." 200 indicates the serial number of rows in the WAF management table. The "No." 200 is used to manage elements.

An item "Manufacture ID" 201 indicates the ID for identifying the device maker which produced the eMMC, i.e., the manufacture ID of the CID register of the eMMC specified by the standard.

An item "Product Name" 202 indicates the ID for identifying the device, i.e., the product name of the CID register of the eMMC defined by the standard.

An item "Host Write Data Size" 203 indicates the write data size which is specified to the eMMC 112 by the main SoC 101. The WAF management table describes all of write data sizes which may possibly be specified by the main SoC 101. According to the exemplary embodiment, the main SoC 101 as a host system is assumed to write five different data sizes: 4K, 8K, 16K, 32K, and 64K bytes.

An item "WAF" 204 denotes the numerical value of the estimated WAF for each write data size to be written to the NAND flash memory by the main SoC 101. The numerical values described as the item "WAF" 204 are values calculated from values in an operation simulation and specifications sheet.

Figure 3:
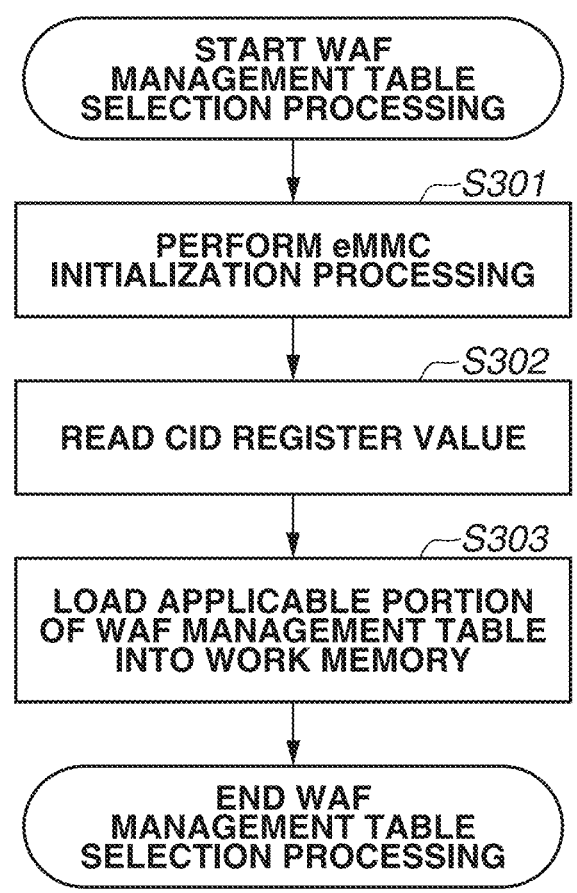
FIG. 3 is a flowchart illustrating WAF management table selection processing according to the first and the second exemplary embodiments.

FIG. 3 is a flowchart illustrating processing for loading the WAF management table performed when the image forming apparatus 100 is activated according to the first exemplary embodiment. The processing illustrated in FIG. 3 is performed by the CPU 102 in the system start sequence after turning power of the image forming apparatus 100 ON. A program for executing the processing illustrated in FIG. 3 is stored in the ROM 107. This processing is implemented when the CPU 102 loads the program into the RAM 106 and executes the program.

In step S301, the CPU 102 performs initialization processing for the eMMC 112. The contents of the processing performed by the CPU 102 in step S301 is processing specified by the standard. For example, in step S301, the CPU 102 performs processing for initializing the register of the eMMC 112 and processing for setting the access speed between the main SoC 101 and the eMMC 112.

After completion of the processing of the eMMC 112, then in step S302, the CPU 102 reads the value of the CID register. As described above, the CID register 115 is a register specified by the standard. The CID register 115 includes such information as the manufacture ID indicating the device maker and the product name for identifying the apparatus. In step S302, the CPU 102 reads the manufacture ID and the product name from the CID register 115. The manufacture ID and the product name read in this step are used to calculate the WAF to be estimated when the CPU 102 writes data to the eMMC 112. The use of the manufacture ID and the product name read in step S302 makes it possible to use the WAF corresponding to the type of the eMMC 112 built in the image forming apparatus 100.

In step S303, based on the manufacture ID and the product name read in step S302, the CPU 102 loads only the applicable portion of the WAF management table stored in the eMMC 112, into the RAM 106. For example, when the manufacture ID and the product name read in step S302 are 0xEE and 0x567891234DEF, respectively, the CPU 102 loads rows of "No." 006 to 010 in the WAF management table illustrated in FIG. 2, into the RAM 106. After loading the WAF management table, the CPU 102 ends the processing illustrated in FIG. 3.

Figure 4:
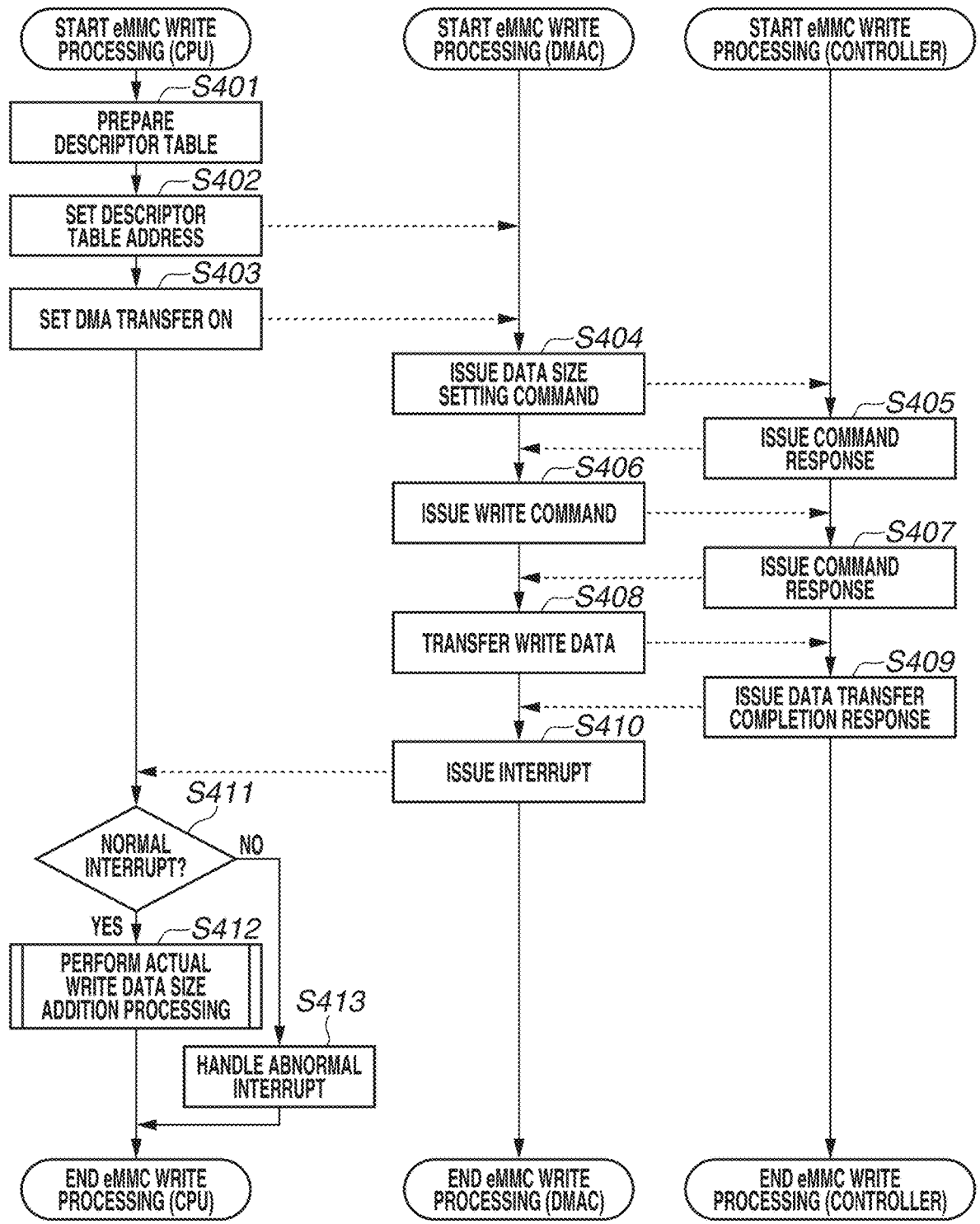
FIG. 4 is a flowchart illustrating embedded Multi Media Card (eMMC) write processing according to the first exemplary embodiment.

FIG. 4 is a flowchart illustrating eMMC write processing according to the first exemplary embodiment. The eMMC write processing is processing in which the main SoC 101 writes data to the eMMC 112 under the collaboration of the CPU 102, the DMAC 105, and the controller 114. The flowchart illustrating the processing by the CPU 102 is stored in the ROM 107. The CPU 102 loads the program into the RAM 106 and executes the program.

In step S401, the CPU 102 generates a descriptor table 500 for controlling the DMAC 105, on the RAM 106. The descriptor table 500 will be described in detail below. In step S401, the CPU 102 allocates a data area for generating a descriptor table, on the RAM 106.

Figure 5:
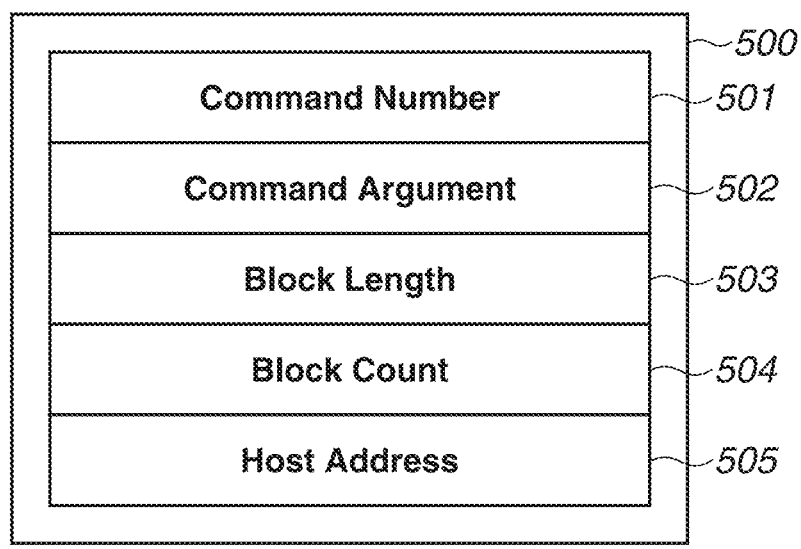
FIG. 5 is a diagram illustrating an example of a configuration of a descriptor table according to the first and the second exemplary embodiments.

FIG. 5 illustrates a configuration of the descriptor table 500 according to the first exemplary embodiment.

As described above, the descriptor table 500 is generated and stored in the RAM 106 by the CPU 102. The starting address of the area where the descriptor table 500 is stored is set to a register of the DMAC 105 by the CPU 102. The DMAC 105 accesses the descriptor table 500 based on the set starting address and operates according to the contents of the descriptor table 500.

A Command Number 501 indicates a command number to be issued to the controller 114 by the DMAC 105. This command number is similar to the command number specified by the standard stipulated by JEDEC. The DMAC 105 references the number stored in the Command Number 501 to determine processing.

A Command Argument 502 is a command argument to be issued to the controller 114 by the DMAC 105. The content of the command argument is specified by the standard. For example, when the command issued by the DMAC 105 is a write command, the command argument includes the write destination address.

A Block Length 503 denotes a unit block length of the data to be transferred between the DMAC 105 and the controller 114.

A Block Count 504 denotes the number of blocks to be transferred between the DMAC 105 and the controller 114.

A Host Address 505, which is an address on the RAM 106, indicates the starting address of the data to be transferred between the DMAC 105 and the controller 114. More specifically, when performing write processing for writing data stored in the RAM 106 to the eMMC 112, the Host Address 505 indicates the address in the RAM 106 where the data to be transferred is stored. Meanwhile, when performing read processing for reading data stored in the eMMC 112, the Host Address 505 denotes the transfer destination address of the data read from the eMMC 112.

Multiplying the value of the Block Length 503 by the value of the Block Count 504 out of the contents of the descriptor table gives the value of the item "Host Write Data Size" 203. For example, when the Block Length 503 is 512 bytes and the Block Count 504 is 8, the item "Host Write Data Size" 203 is 4K bytes. The above-described calculation enables the CPU 102 to obtain the write data size specified to the eMMC 112 by the main SoC 101. The write data size specified to the eMMC 112 by the main SoC 101 via the DMAC 105 is different from the write data size to be actually written to the NAND flash memory 116 by the controller 114 of the eMMC 112.

In step S402, the CPU 102 sets the starting address of the descriptor table 500 stored in the RAM 106 in step S401 to the DMAC 105. The DMAC 105 accesses the address set in step S402 to be able to acquire the contents of the descriptor table 500 and operate according to the settings in the descriptor table 500.

In step S403, the CPU 102 sets the enable register of the DMAC 105 to ON. When the CPU 102 sets the enable register of the DMAC 105 to ON, the DMAC 105 accesses the address set in step S402 to start the DMA transfer.

In step S404, the DMAC 105 issues a write data size setting command to the controller 114 based on the contents of the descriptor table 500. In step S404, the CPU 102 acquires the unit block length and the number of blocks stored in the descriptor table 500 and issues commands. The CPU 102 issues a command CMD 16 for setting the block length and a command CMD 23 for setting the number of data blocks to be written to the controller 114, to the controller 114 of the eMMC 112.

The controller 114 of the eMMC 112 receives the command for setting the block length, and the command indicating the number of write data blocks, from the DMAC 105. In step S405, the controller 114 performs processing for respective commands and issues the result of the processing to the DMAC 105. The format of this response is specified by the standard. The controller 114 notifies the DMAC 105 of a response for indicating whether the processing for the received commands is normally completed.

The DMAC 105 waits for reception of a notification indicating that the processing for the commands issued in step S404 is normally completed, from the controller 114. In step S406, upon reception of the notification indicating that the processing for the commands issued in step S404 is normally completed, the DMAC 105 issues write commands to the controller 114 based on the contents of the descriptor table 500. In step S406, the DMAC 105 issues a command CMD 24 (WRITE_BLOCK) and a command CMD 25 (WRITE_MULTILE_BLOCK) based on the descriptor table 500. In the above-described case, the controller 114 issues, in step S405, a response indicating that the processing for the commands issued in step S404 is normally completed. After completion of step S404, if the controller 114 issues a response indicating that the processing for the commands issued in step S404 is not normally completed, the DMAC 105 performs the processing in step S404 again.

In step S406, the controller 114 performs the processing for the commands issued by the DMAC 105. In step S407, after completion of the processing, the controller 114 notifies the DMAC 105 of information indicating whether the processing is normally completed as a response. The format of this response is specified by the standard. In step S407, the status of the controller 114 for the received commands is notified to the DMAC 105.

The DMAC 105 waits for reception of a response for the commands issued in step S406, from the controller 114. In step S408, upon reception of the response indicating that the processing for the commands issued in step S406 is normally completed, from the controller 114, the DMAC 105 transfers data to be written to the eMMC 112, to the controller 114.

In step S408, the DMAC 105 reads data from the RAM 106 based on the contents of the descriptor table 500 and transfers the data to the eMMC 112. In step S408, the DMAC 105 accesses the data on the RAM 106 based on the Host Address 505 in the descriptor table 500. Then, the DMAC 105 transfers the data read from the RAM 106 to the controller 114. In the above-described case according to the present exemplary embodiment, the processing for the commands issued in step S406 is normally completed and then the DMAC 105 receives a response indicating that the processing is normally completed. When a response indicating the processing for the commands issued in step S406 is not normally completed is issued in step S407, the DMAC 105 may return to the processing in step S406 without performing the processing in step S408.

Upon acquisition of the data to be written to the NAND flash memory 116 of the eMMC 112, from the DMAC 105, the controller 114 writes the data to the NAND flash memory 116. In step S409, when the writing to the NAND flash memory 116 is normally completed, the controller 114 issues a response indicating that the writing is normally completed to the DMAC 105. The format of this response is specified by the standard. The status of the received data is notified to the DMAC 105 by the response. The status notified to the DMAC 105 in step S409 includes the result of error detection for the data transferred in step S408.

In step S410, upon reception of the response from the controller 114, the DMAC 105 issues an interrupt to the CPU 102. In step S409, based on the result of error detection output from controller 114, the DMAC 105 determines whether the writing of the data which started being transferred in step S408 is normally completed. When the data writing to the NAND flash memory 116 is normally completed, the DMAC 105 outputs an interrupt signal indicating that the data transfer is normally completed to the CPU 102. On the other hand, when the data writing to the NAND flash memory 116 is not normally completed, the DMAC 105 outputs an interrupt signal indicating that the data transfer is not normally completed to the CPU 102.

The CPU 102 receives the interrupt signal from the DMAC 105. In step S411, the CPU 102 determines whether the interrupt signal received from the DMAC 105 is an interrupt signal indicating that the data transfer is normally completed. In a case where the CPU 102 determines that the received interrupt signal is an interrupt signal indicating that the data transfer to the eMMC 112 is normally completed (YES in step S411), the processing proceeds to step S412. Meanwhile, in a case where the CPU 102 determines that the received interrupt signal is an interrupt signal indicating that the data transfer is not normally completed (NO in step S411), the processing proceeds to step S413 (described below).

In step S412, the CPU 102 performs processing for estimating the data size of the data having been actually written to the NAND flash memory 116 by the controller 114 and obtaining the total data size including the data size having been written to the NAND flash memory 116 so far. The processing in step S412 will be described in detail below.

If the CPU 102 receives an abnormal interrupt in step S410, then in step S413, the CPU 102 performs a recovery operation such as retransfer and displays an abnormal condition on the UI 108. Step S413 is not directly related to the present disclosure, and a more detailed description thereof will be omitted. If the data writing to the NAND flash memory 116 fails, the CPU 102 does not perform processing for obtaining the actual write data size.

Figure 6:
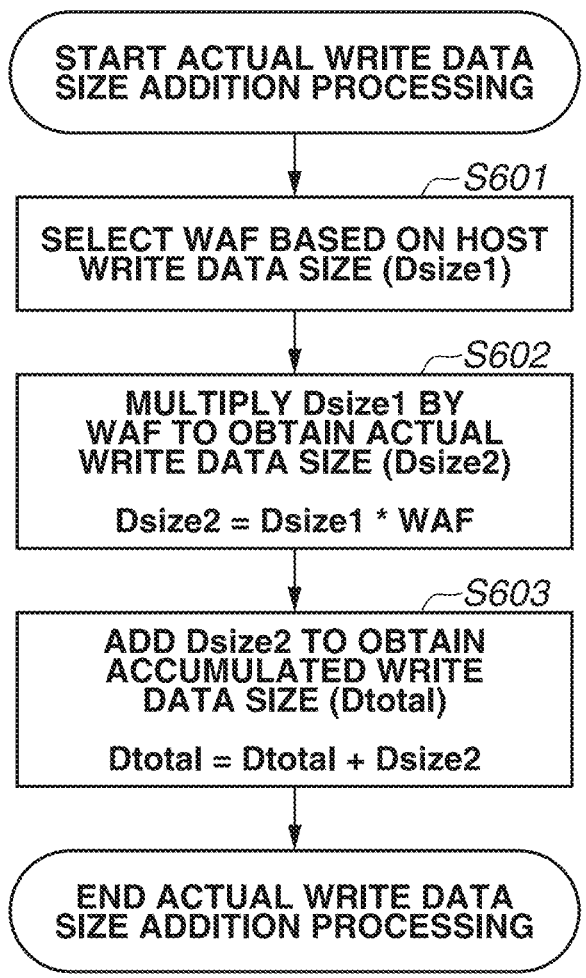
FIG. 6 is a flowchart illustrating actual write data size addition processing according to the first and the second exemplary embodiments.

FIG. 6 is a flowchart illustrating actual write data size addition processing performed by the CPU 102 in step S412 illustrated in FIG. 4. The actual write data size addition processing calculates the total data size to be actually written to the eMMC 112 to obtain the total write data size for the eMMC 112. A program for executing the processing illustrated in FIG. 6 is stored in the ROM 107. This processing is implemented when the CPU 102 loads the program into the RAM 106 and executes the program.

In step S601, the CPU 102 estimates the WAF based on a write data size (Dsize1) specified based on the descriptor table 500. In step S601, Dsiza1 is the product of the Block Length 503 and the Block Count 504 in the descriptor table 500. The CPU 102 selects the WAF corresponding to Dsize1 based on the WAF management table loaded into the RAM 106. For example, when Dsize1 is 8K bytes when Nos. 001 to 005 in the WAF management table illustrated in FIG. 2 are loaded in the RAM 106 in step S303, the WAF 2.0 is selected.

In step S602, the CPU 102 multiplies Dsize1 by the WAF selected in step S601 to calculate Dsize2 as the data size to be actually written to the NAND flash memory 116 by the eMMC 112. For example, when Dsize1 is 8K bytes and the WAF is 2.0, Dsize2 is 16K bytes.

In step S603, the CPU 102 adds Dsize2 obtained in step S602 to an accumulated write data size (Dtotal). For example, when Dsize2 obtained in step S602 is 16K bytes and the previous Dtotal is 100K bytes, Dtotal newly obtained in step S603 is 116K bytes. Dtotal written to the eMMC 112 is written to the RAM 106 during activation of the image forming apparatus 100. During operation of the image forming apparatus 100, the CPU 102 updates the value of Dtotal stored in the RAM 106 each time data is written to the eMMC 112. When power of the image forming apparatus 100 is turned OFF, Dtotal stored in the eMMC 112 is updated with the value of Dtotal stored in the RAM 106.

Figure 7:
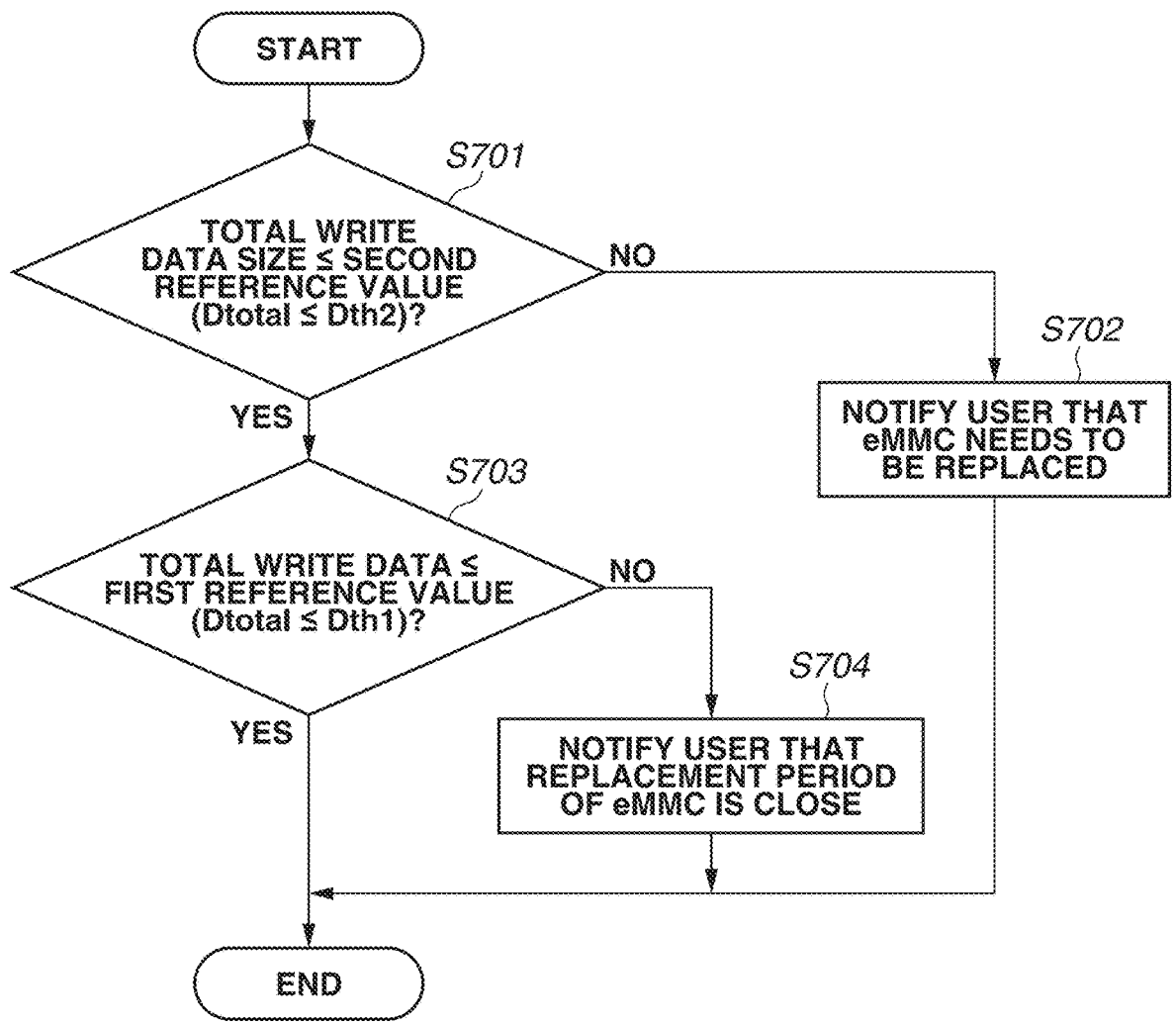
FIG. 7 is a flowchart illustrating life determination processing according to the first and the second exemplary embodiments.

FIG. 7 illustrates a processing procedure for promoting the user to replace the main controller attached to the eMMC 112 when the accumulated write data size Dtotal of the eMMC 112 comes close to the upper limit. A program for executing the processing of the flowchart illustrated in FIG. 7 is stored in the ROM 107. This processing is implemented when the CPU 102 loads the program into the RAM 106 and executes the program. The flowchart illustrated in FIG. 7 is performed in the system start sequence after turning power of the image forming apparatus 100 ON. However, after power of the image forming apparatus 100 is turned ON, the processing illustrated in FIG. 7 may be periodically performed, for example, at a timing set by the user.

In step S701, the CPU 102 reads Dtotal from the RAM 106 and determines whether Dtotal is equal to or less than a second reference value (Dth2). For example, Dth2 is 900/% of the data sizes described in the data sheet as the writing life of the eMMC 112. For example, when the actual write data size as the writing life is 100 G bytes, Dth2 is 90 G bytes.

In a case where Dtotal is equal to or less than Dth2 (YES in step S701), the processing proceeds to step S703. Meanwhile, in a case where Dtotal is larger than Dth2 (NO in step S701), the processing proceeds to step S702.

In step S702, the CPU 102 notifies the user that the eMMC 112 needs to be replaced. When the total write data size for the eMMC 112 is close to the upper limit of the write data of the eMMC 112, writing additional data will disable the data guarantee in the eMMC 112. Therefore, in a case where the data size estimated as the total write data size for the eMMC 112 exceeds Dth2 (NO in step S701), then in step S702, the CPU 102 issues a notification for prompting the user to communicate with a service engineer to replace the controller substrate mounting the eMMC 112. In addition to a screen for promoting the user to communicate with a service engineer, the CPU 102 may automatically issue a parts replacement dispatch notification to a service center via the external I/F 111. In this way, when the data size estimated as the total write data size for the eMMC 112 comes close to the writing life, the CPU 102 warns the user to use a new memory. The above-described processing prevents the total write data size for the eMMC 112 from exceeding the total write data size as the writing life, and the data having been written to the eMMC 112 can be guaranteed.

In a case where the total write data size Dtotal for the eMMC 112 is equal to or less than Dth2 (YES in step S701), then in step S703, the CPU 102 determines whether Dtotal is equal to or less than the first reference value (Dth1). According to the present exemplary embodiment, Dth1 is smaller than Dth2. For example, Dth1 is set to 70% of the write data size as the writing life of the eMMC 112.

In a case where Dtotal is not equal or less than Dth1 (NO in step S703), the processing proceeds to step S704.

In step S704, the CPU 102 displays a screen for notifying the user that the end of the writing life of the eMMC 112 is close, on the UI 108. The message displayed on the UI 108 is different from the message displayed in step S702, and needs to be a message indicating that the replacement period of the eMMC 112 is close. If Dth1 smaller than Dth2 is set, the user is notified that the end of the writing life of the eMMC 112 is close and accordingly the replacement period of the memory is close. Although, in the present exemplary embodiment, the user is notified stepwise that the end of the writing life of the eMMC 112 is close by using two different threshold values, the CPU 102 may notify the user only in a state where the replacement is required, without performing the processing in steps S703 and S704.

According to the present exemplary embodiment, it becomes possible to select a suitable WAF according to the data size to be written to the eMMC 112 by the main SoC 101 and to calculate the data size of the data to be actually written to the NAND flash memory 116. By totalizing the calculated data sizes and comparing the total data size with the write data size as the writing life of the eMMC 112, the user can know that the end of the life of the memory is close even if the actual write data size of the memory cannot be correctly known.

According to the first exemplary embodiment, the CPU 102 performed the actual write data size addition processing in step S412 after normal completion of the write processing for the eMMC 112. According to the second exemplary embodiment, before completion of the data writing to the eMMC 112, the CPU 102 estimates the actual write data size for the NAND flash memory 116 of the eMMC 112 and calculates the total write data size addition processing. According to the second exemplary embodiment, before completion of the data writing to the eMMC 112, the CPU 102 predicts the actual write data size for the eMMC 112 and calculates the total write data size. The above-described processing enables reducing the required processing after completion of the write processing for the eMMC 112 and accordingly shortening the required time period until the writing is completed.

The configurations and processing illustrated in FIGS. 1, 2, 3, 5, 6, and 7 are similar to those according to the first exemplary embodiment, and redundant descriptions thereof will be omitted.

Figure 8:
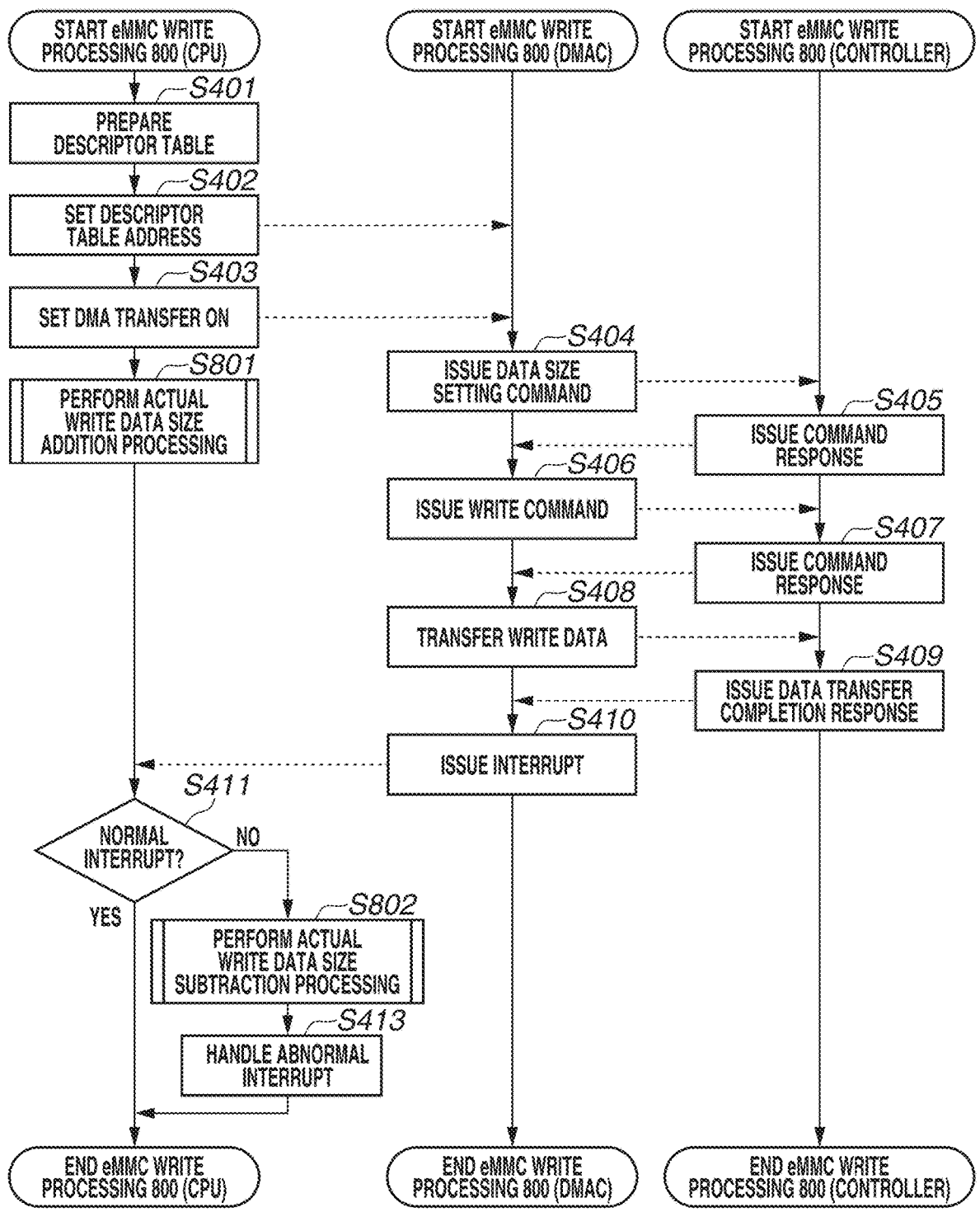
FIG. 8 is a flowchart illustrating eMMC write processing according to the second exemplary embodiment.

FIG. 8 is a flowchart illustrating eMMC write processing 800 according to the second exemplary embodiment. The eMMC write processing 800 is performed by the main SoC 101 to write data to the eMMC 112. This processing is implemented by the CPU 102, the DMAC 105, and the controller 114 in a collaborative way. A program indicating the processing performed by the CPU 102 is stored in the ROM 107. This processing illustrated in FIG. 8 is implemented when the CPU 102 loads the program into the RAM 106 and executes the program. Referring to FIG. 8, processing steps similar to those illustrated in FIG. 4 are assigned the same reference numerals, and only steps different from those in the first exemplary embodiment will be described below.

In step S801, the CPU 102 calculates the actual write data size for the eMMC 112 based on the contents of the descriptor table 500 generated in step S401, and calculates the total write data size. In step S801, the CPU 102 performs similar processing to the actual write data size addition processing illustrated in FIG. 6.

In a case where the interrupt signal received from the DMAC 105 by the CPU 102 is not an interrupt signal indicating that the data writing is normally completed (NO in step S411), the processing proceeds to step S802. In step S802, the CPU 102 performs processing for subtracting the actual write data size calculated in step S801. The processing performed by the CPU 102 in step S802 will be described below with reference to FIG. 9.

According to the second exemplary embodiment, in step S801, the CPU 102 estimates the actual write data size for the eMMC 112 and predicts the total write data size, regardless of whether the data writing to the eMMC 112 is normally completed. The above-described processing enables completing the data write processing without performing the processing for estimating the actual write data size after the data writing to the eMMC 112.

Figure 9:
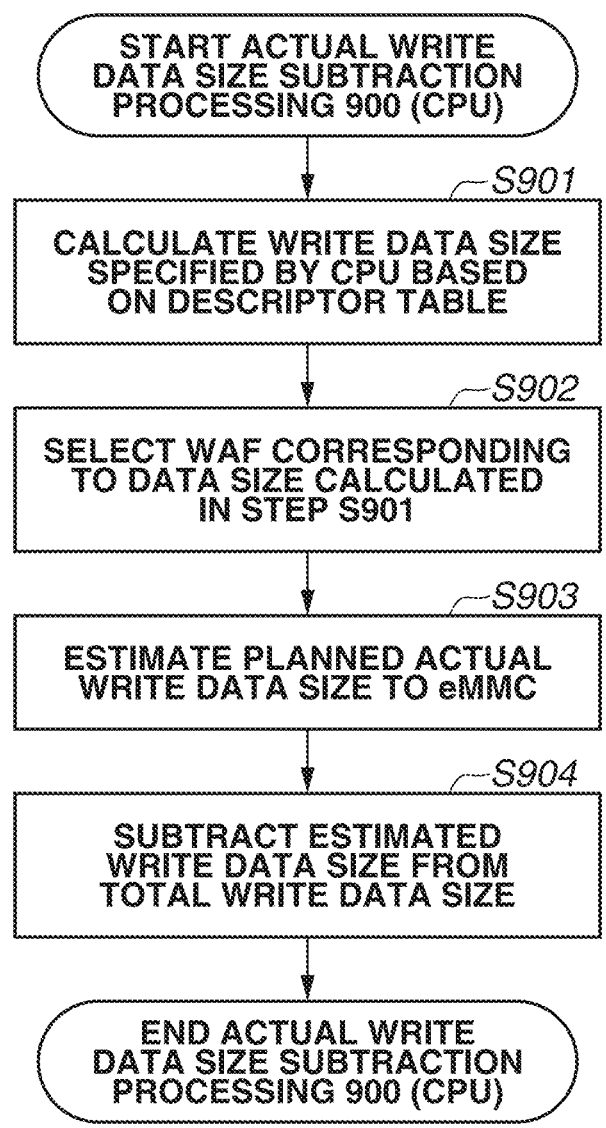
FIG. 9 is a flowchart illustrating actual write data size subtraction processing according to the second exemplary embodiment.

FIG. 9 is a flowchart illustrating actual write data size subtraction processing 900 performed by the CPU 102 in step S802 illustrated in FIG. 8. A program described in the flowchart illustrated in FIG. 9 is stored in the ROM 107. This processing is implemented when the CPU 102 loads the program in the RAM 106 and the program.

In step S901, the CPU 102 calculates the write data size specified to the eMMC 112 by the CPU 102 based on the descriptor table 500. The CPU 102 reads the Block Length 503 and the Block Count 504 from the descriptor table 500 and multiplies the two values to calculate the write data size specified to the eMMC 112 by the CPU 102.

In step S902, the CPU 102 selects the WAF corresponding to the data size calculated in step S901 from the WAF management table loaded into the RAM 106.

In step S903, the CPU 102 estimates a planned actual write data size to the eMMC 112 based on the data size calculated in step S901 and the WAF selected in step 902. In step S903, the CPU 102 multiplies the data size calculated in step S901 by the WAF selected in S902.

Finally, in step S904, the CPU 102 subtracts the estimated write data size obtained in step S903 from the total write data size stored in the RAM 106.

The above-described processing makes it possible to correct the total write data size for the eMMC 112 according to the actual writing situation when the writing to the eMMC 112 has not normally been completed.

Referring to FIG. 9, the data size added to the actual write data size in step S801 is recalculated by using descriptor table 500. In step S801, the CPU 102 stores the data size to be added in the RAM 106. In step S813, the CPU 102 may acquire the data size added in step S801 from the RAM 106 and subtract the added data size from the total write data size.

According to the second exemplary embodiment, after completion of the processing illustrated in FIG. 8, the CPU 102 performs the processing illustrated in FIG. 7 at a certain timing. Performing the processing illustrated in FIG. 7 enables the eMMC 112 to predict the total write data size even if the eMMC 112 cannot know the actual write data size, and notify the user that the write data size to the eMMC 112 is close to the upper limit.

According to the second exemplary embodiment, it becomes possible to select a suitable WAF according to the data size to be written to the eMMC 112 by the main SoC 101 and calculate the actual write data size. In addition, the CPU 102 is able to perform the calculation of the actual write data size without waiting for completion of the DMA transfer. With this configuration, the CPU 102 does not estimate the actual write data size after completion of the data writing to the eMMC 112 and does not perform processing for adding the estimated data size to the total write data size. Therefore, the time period required after the data writing to the eMMC 112 can be shortened.

According to the first and the second exemplary embodiments, the actual write data size addition processing is performed each time the write processing is performed. According to a third exemplary embodiment, the actual write data size addition processing is performed at a timing different from the write processing. A specific timing will be described below in the descriptions of exemplary embodiments.

The configurations and processing illustrated in FIGS. 2, 3, 5, and 7 are similar to those according to the first exemplary embodiment, and redundant descriptions thereof will be omitted.

Figure 10:
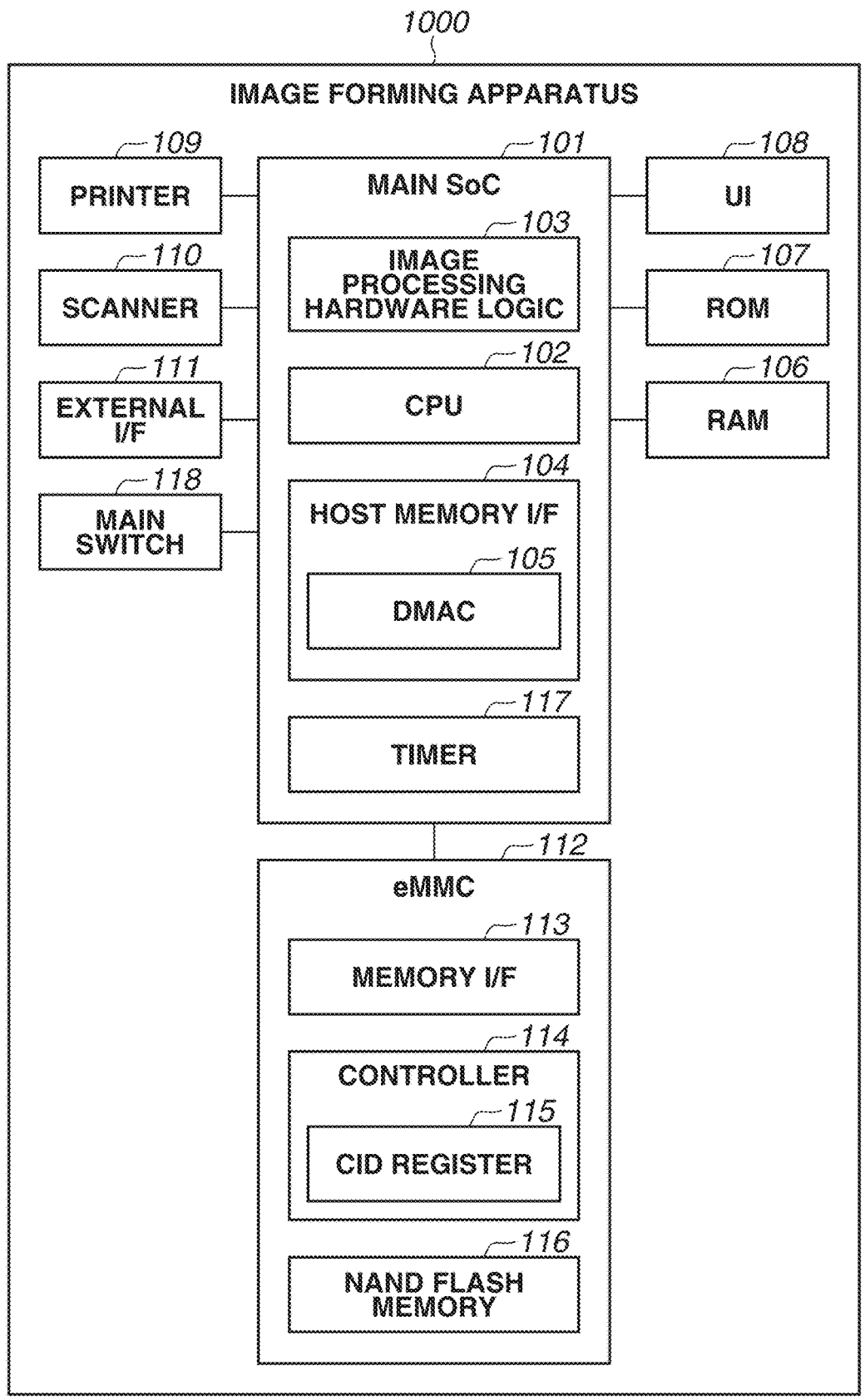
FIG. 10 is a diagram illustrating an example of a configuration of an image forming apparatus according to a third and a fourth exemplary embodiment.

FIG. 10 is a configuration of the image forming apparatus 100 according to the third exemplary embodiment. Referring to FIG. 10, elements similar to those illustrated in FIG. 1 are assigned the same reference numerals, and redundant descriptions thereof will be omitted.

When the count value of a timer 117 reaches a threshold value, the timer 117 transmits an interrupt signal to the CPU 102. The count period and the threshold value can be arbitrarily set by the CPU 102.

A main switch 118 is operated by the user to arbitrarily turn power of the image forming apparatus 1000 ON or OFF. The CPU 102 is connected to the main switch 118 and is able to receive an interrupt signal indicating that the main switch 118 is turned ON or OFF.

Figure 11:
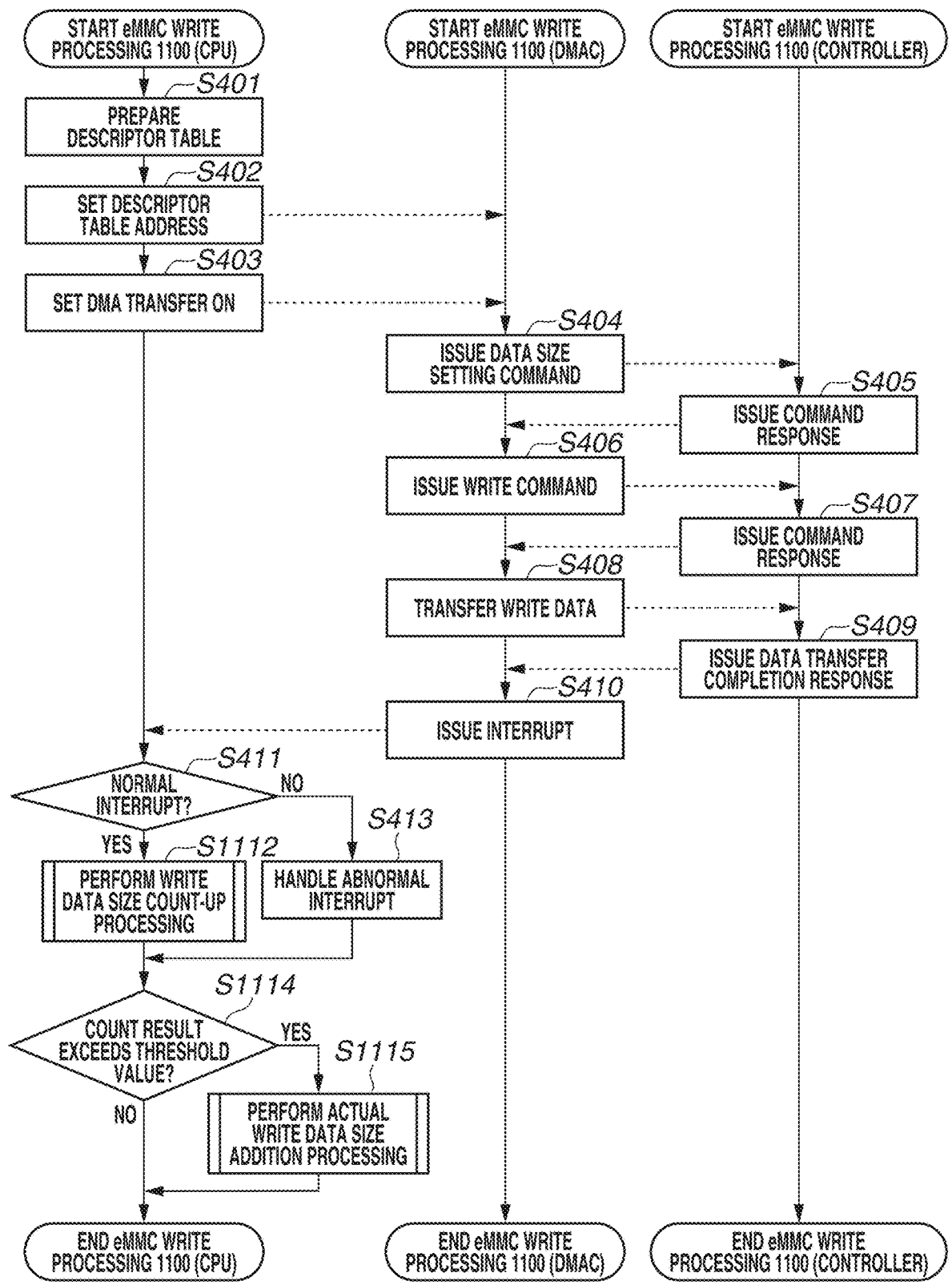
FIG. 11 is a flowchart illustrating eMMC write processing according to the third exemplary embodiment.

FIG. 11 is a flowchart illustrating eMMC write processing 1100 according to the third exemplary embodiment. The eMMC write processing 1100 is performed by the main SoC 101 to write data to the eMMC 112. This processing is implemented by the CPU 102, the DMAC 105, and the controller 114 in a collaborative way. Referring to FIG. 11, elements similar to those illustrated in FIG. 3 are assigned the same reference numerals, and redundant descriptions thereof will be omitted. The processing illustrated in FIG. 11 differs from the processing illustrated in FIG. 3 in the processing in step S411 and subsequent steps.

In step S411, the CPU 102 receives an interrupt signal from the DMAC 105 and determines whether the interrupt signal received from the DMAC 105 is an interrupt signal indicating that the data transfer is normally completed. In a case where the CPU 102 determines that the received interrupt signal is an interrupt signal indicating that the data transfer to the eMMC 112 is normally completed (YES in step S411), the processing proceeds to step S1112. Meanwhile, in a case where the CPU 102 determines that the received interrupt signal is an abnormal interrupt signal indicating that the data transfer is not normally completed (NO in step S411), the processing proceeds to step S413 (described below).

In step S1112, in the DMA transfer in steps S403 to S410, the CPU 102 performs count-up processing based on the write data size transferred from the DMAC 105 to the controller 114 (i.e., host write data size). Based on the consideration that the WAF is different for each host write data size, the CPU 102 performs the count-up processing by using a counter prepared for each data size. Step S1112 will be illustrated in detail below with reference to FIG. 12.

The CPU 102 performs step S413 when the CPU 102 receives an abnormal interrupt in step S410. In step S413, the CPU 102 performs a recovery operation such as retransfer and displays the abnormal condition on the UI 108. Step S413 is not directly related to the present disclosure, and a more detailed description thereof will be omitted.

In step S114, the CPU 102 determines whether the value of each counter to be used for the processing in step S1112 exceeds a predetermined threshold value. In a case where the counter value exceeds the threshold value (YES in step S1114), the processing proceeds to step S1115. The threshold value is defined to have a sufficient margin so that the counter does not overflow in any situation. Meanwhile, in a case where the counter value does not exceed the threshold value (NO in step S1114), the CPU 102 ends the EMMC write processing 1100.

In step S1115, the CPU 102 calculates the accumulated write data size based on the counter value. Step S1115 will be described in detail below with reference to FIG. 13.

In the eMMC write processing 1100, the CPU 102 performs the write data size count-up processing in step S1112 and performs comparison between the count value and the threshold value in step S1114. These pieces of processing include simple count-up processing and bit operation (comparison) processing in comparison with the actual write data size addition processing 700 described below with reference to FIG. 7. Therefore, these pieces of processing will be extremely light load on the CPU 102.

Figure 12:
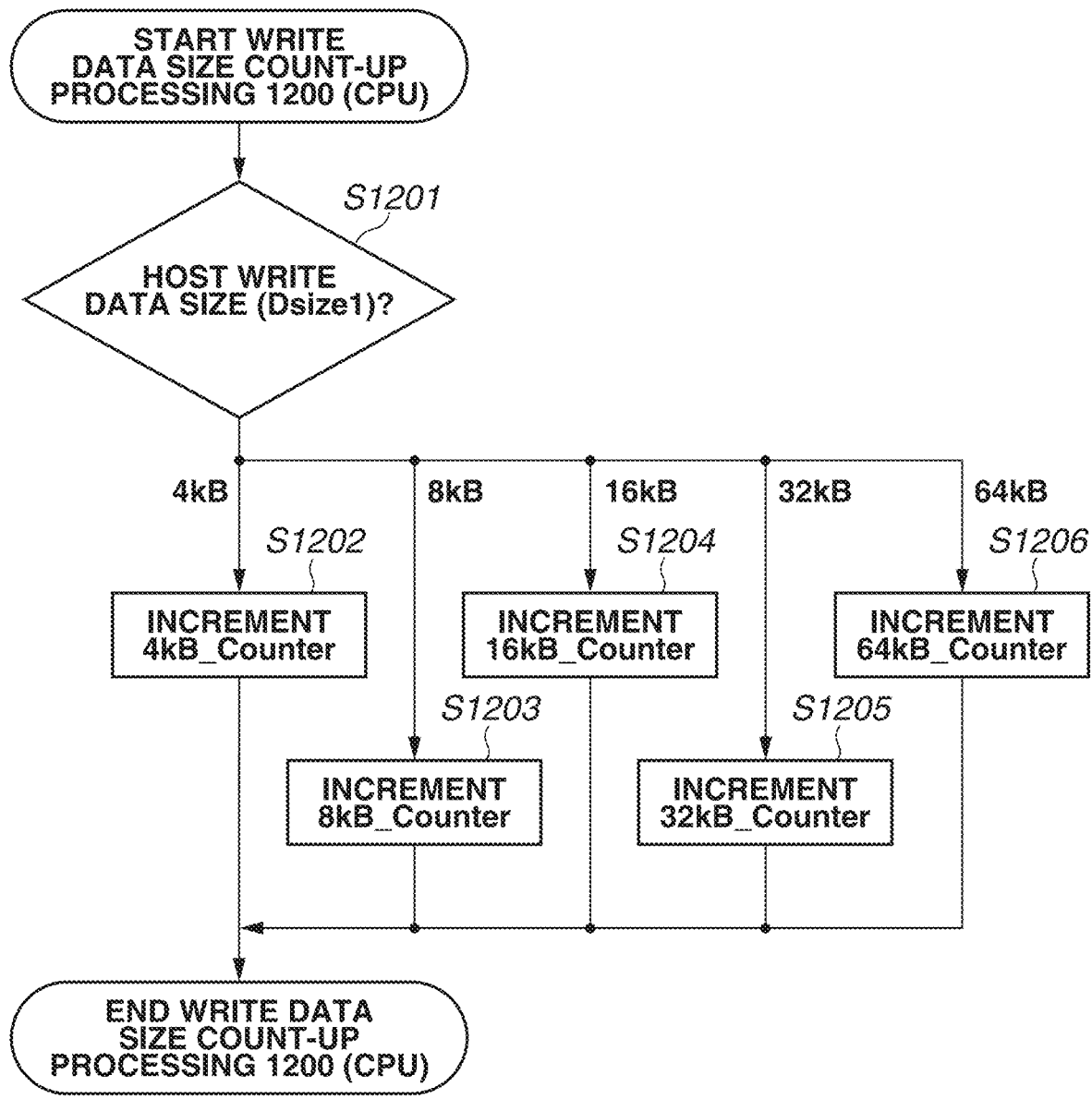
FIG. 12 is a flowchart illustrating write data size count-up processing according to the third and the fourth exemplary embodiments.

Step S1112 will be described in detail below with reference to FIG. 12. FIG. 12 is a flowchart illustrating write data size count-up processing 1200 according to the third exemplary embodiment. The write data size count-up processing 1200, performed by the CPU 102 in step S1112 in the eMMC write processing 1100, is processing for incrementing the counters based on the host write data size (Dsize1).

In step S1201, the CPU 102 determines the counter to be incremented, based on the host write data size (Dsize1). The host write data size (Dsize1) can be determined based on the contents of the descriptor table 500 described above with reference to FIG. 5.

Step S1202 is performed when the host write data size (Dsize1) is determined to be 4K bytes in step S1201. In step S1202, the CPU 102 increments 4 kB_Counter (counter for 4K bytes).

Step S1203 is performed when the host write data size (Dsize1) is determined to be 8K bytes in step S1201. In step S1203, the CPU 102 increments 8 kB_Counter (counter for 8K bytes).

Step S1204 is performed when the host write data size (Dsize1) is determined to be 16K bytes in step S1201. In step S1204, the CPU 102 increments 16 kB_Counter (counter for 16K bytes).

Step S1205 is performed when the host write data size (Dsize1) is determined to be 32K bytes in step S1201. In step S1205, the CPU 102 increments 32 kB_Counter (counter for 32K bytes).

Step S1206 is performed when the host write data size (Dsize1) is determined to be 64K bytes in step S1201. In step S1206, the CPU 102 increments 64 kB_Counter (counter for 64K bytes).

Upon completion of steps S1202 to S1206, the count-up processing is completed.

The present exemplary embodiment has been described above centering on an example where the counters for 4K to 64K bytes are prepared, counters for other data sizes may be prepared for counting.

Figure 13:
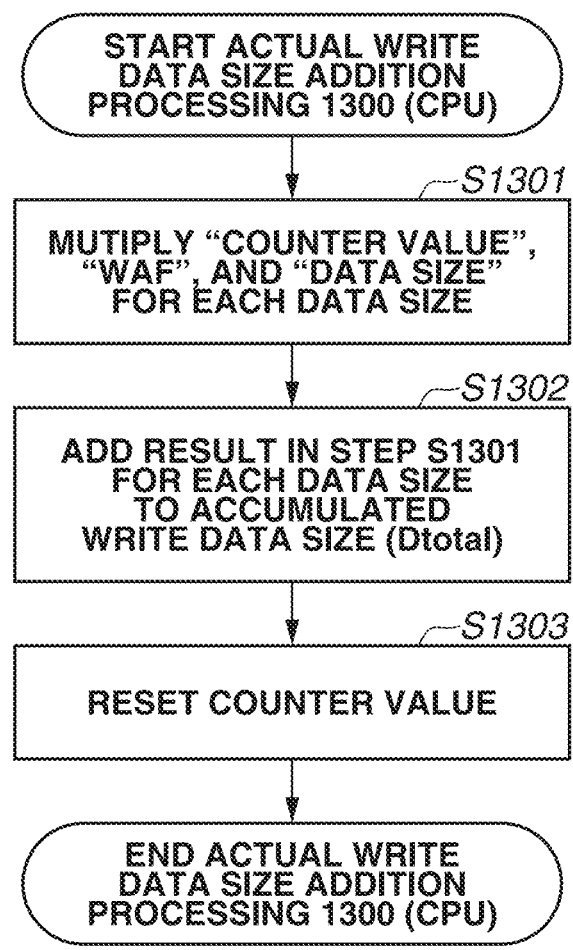
FIG. 13 is a flowchart illustrating actual write data size addition processing according to the first and the second exemplary embodiments.

Step S1115 will be described in detail below with reference to FIG. 13. FIG. 13 is a flowchart illustrating actual write data size addition processing 1300 according to the third exemplary embodiment. The actual write data size addition processing 1300, performed by the CPU 102 in step S415 in the eMMC write processing 400, is processing for calculating the accumulated write data size (Dtotal).

The actual write data size addition processing 1300 may be performed in other than step S1115, for example, at the time of system shutdown, at the time of transition to the sleep state (power-saving state), and at fixed time intervals (each time a timer interrupt occurs). The actual write data size addition processing 1300 will be described in detail below with reference to FIGS. 14A, 14B, and 14C.

In step S1301, the CPU 102 multiplies "Counter Value", "WAF", and "Data Size" for each data size to calculate the actual write data size for each data size. In an example case where the WAF value corresponding to the 4 kB host write data size of the eMMC is 8.0 out of the values illustrated in FIG. 2 and where the value of 4 kB_Counter is 500, the actual write data size is 16,000K (=500*8*4K) bytes. Such a calculation is performed for each data size.

In step S1302, the CPU 102 adds the result of the calculation for each data size performed in step S1301 to the accumulated write data size (Dtotal). For example, if the result of the calculation in step S1301 is 72,000K bytes and Dtotal is 100,000K bytes, Dtotal newly calculated in step S1302 is 172,000K bytes.

In step S1303, the CPU 102 resets all of the counters for respective data sizes (initializes the count results to 0). Upon completion of step S1303, the CPU 102 ends the actual write data size addition processing 1300.

Execution timings of the actual write data size processing different from the execution timings in steps S1114 and S1115 illustrated in FIG. 11 will be described below with reference to FIGS. 14A to 14C. Three different timings will be described below as an example. Referring to FIG. 11, the actual write data size processing may be performed at each timing illustrated in FIGS. 14A to 14C after execution of steps S1114 and S115. Alternatively, the actual write data size processing may be performed at each timing illustrated in FIGS. 14A to 14C without performing steps S1114 and S1115 illustrated in FIG. 11.

Figure 14A:
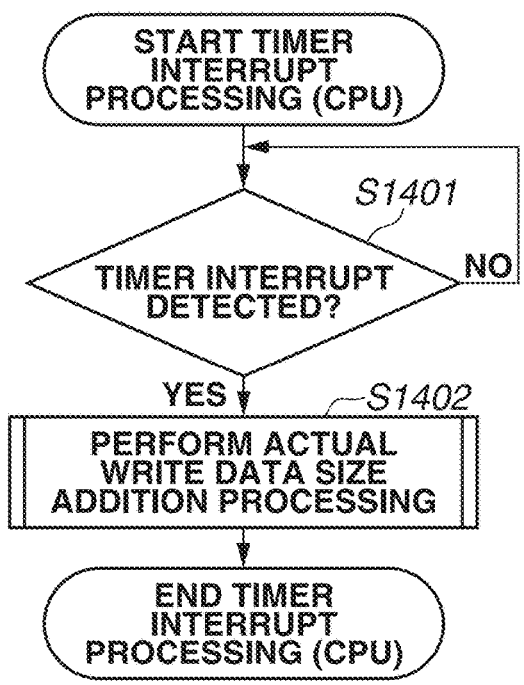
FIGS. 14A, 14B, and 14C are flowcharts illustrating timer interrupt processing, power state transition processing, and shutdown processing according to the third and the fourth exemplary embodiments.
Figure 14B:
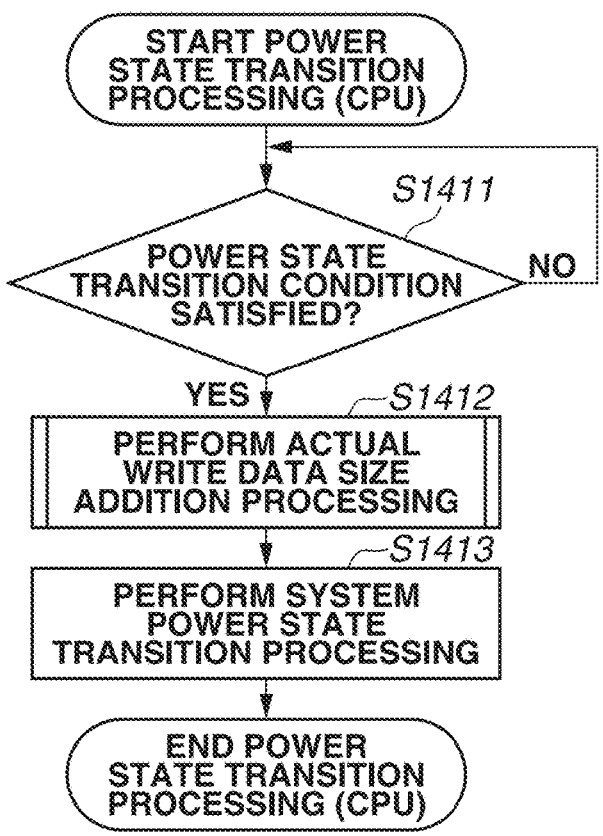
Figure 14C:
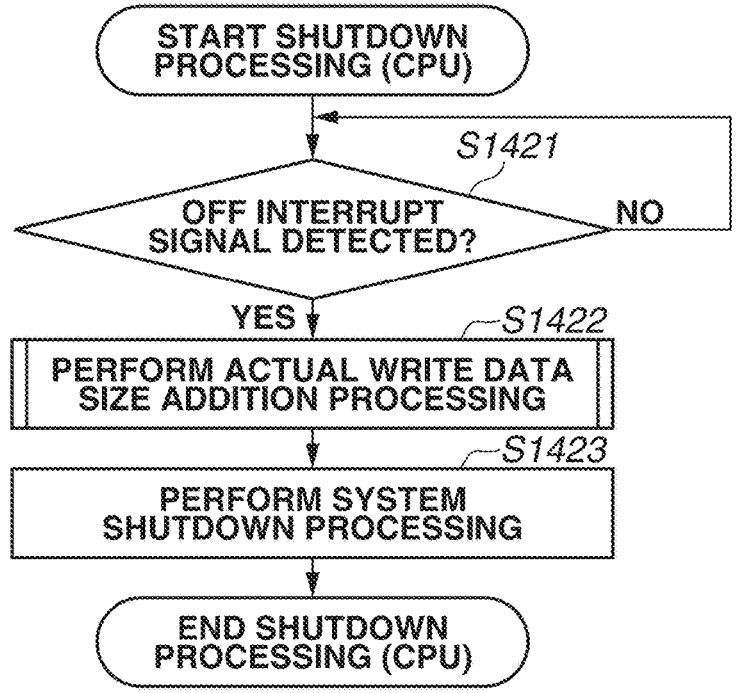

FIGS. 14A to 14C are flowcharts illustrating execution timings of the actual write data size addition processing 1300 according to the present exemplary embodiment.

FIG. 14A is a flowchart illustrating actual write data size addition processing 1400 in timer interrupt processing. A timer 117 is a timer included in general microcomputers and SoCs. When a set time has elapsed (a count value expires), the timer 117 issues an interrupt to the CPU 102. According to the present exemplary embodiment, the timer 117 included in the main SoC 101 is used.

In step S1401, the CPU 102 waits for an interrupt signal from the timer 117. When the CPU 102 detects an interrupt signal from the timer 117, the processing proceeds to step S1402. Step S1402 is the actual write data size addition processing 1300 described above with reference to FIG. 7, and a redundant description thereof will be omitted. Upon completion of step S1402, the CPU 102 ends the time interrupt processing.

FIG. 14B is a flowchart illustrating the actual write data size addition processing 1300 in power state transition processing.

In step S1411, the CPU 102 determines whether the entire system satisfies a power state shift condition. The power state shift condition needs to be satisfied at the time of transition from the normal state (also referred to as a standby state or idle state) to the power-saving state (also referred to as the sleep state or suspend state) providing a lower power consumption than the normal state. For example, if the power state shifts to the power-saving state during execution of a print job or scan job, the job is interrupted. Therefore, the CPU 102 determines that the power state does not shift to the power-saving state during execution of these jobs (i.e., the power state shift condition is not satisfied). The power state shift condition is not directly related to the present disclosure, and a detailed description thereof will be omitted.

In a case where the CPU 102 determines that the entire system satisfies the power state shift condition (YES in step S1411), the processing proceeds to step S1412. Step S1412 is the actual write data size addition processing 1300 described above with reference to FIG. 13, and a redundant description thereof will be omitted.

In step S1413, the CPU 102 shifts the system to the power-saving state. More specifically, the CPU 102 performs control for turning power of the printer 109 and the scanner 110 OFF. Upon completion of step S1413, the CPU 102 ends the power state transition processing.

FIG. 14C is a flowchart illustrating the actual write data size addition processing 1300 in the shutdown processing.

In step S1421, the CPU 102 waits for an OFF interrupt signal from the main switch 118. In a case where the CPU 102 detects the OFF interrupt signal from the main switch 118 (YES in step S1421), the processing proceeds to step S1422.

Step S1422 is the actual write data size addition processing 1300 described above with reference to FIG. 7, and a redundant description thereof will be omitted.

In step S1423, the CPU 102 shifts the system to the shutdown state. More specifically, the CPU 102 performs processing for writing necessary part of the system data loaded in the RAM 106, to the ROM 107. Upon completion of step S1423, the CPU 102 ends the shutdown processing.

According to the present exemplary embodiment, a suitable WAF according to the data size to be written to the eMMC 112 by the main SoC 101 can be selected and the actual write data size can be calculated. As a result, the host system can estimate the actual write data size more accurately than that in conventional cases.

According to the present exemplary embodiment, the CPU 102 performs only the write data size count-up processing at the occurrence timing of the write processing for the eMMC 112 and calculates the actual write data at another timing by using the count value. As a result, it becomes possible to reduce the local concentration of the load on the CPU 102.

According to the third exemplary embodiment, in the eMMC write processing 1100, the write data size count-up processing (step S1112) is performed after reception of the DMA transfer completion interrupt (step S410). In the processing flow according to a fourth exemplary embodiment, the CPU 102 performs the data size count-up processing before reception of the DMA transfer completion interrupt.

Configurations and processing according to the fourth exemplary embodiment are similar to those according to the first exemplary embodiment illustrated in FIGS. 2, 3, 5, and 7, and those according to the third exemplary embodiment illustrated in FIGS. 10, 12, 13, and 14A to 14C, and redundant descriptions thereof will be omitted.

Figure 15:
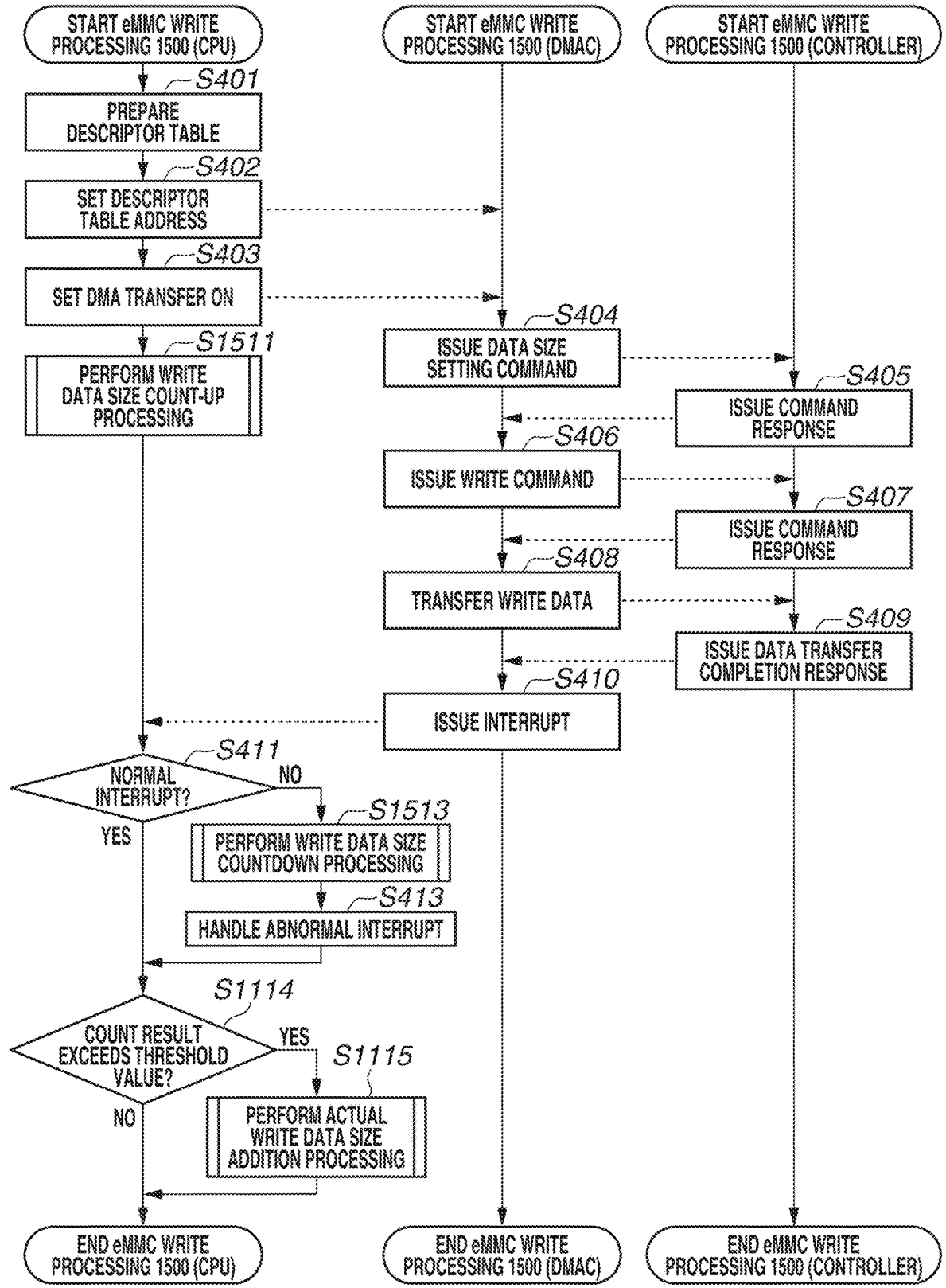
FIG. 15 is a flowchart illustrating eMMC write processing according to the fourth exemplary embodiment.

FIG. 15 is a flowchart illustrating eMMC write processing 1500 according to the fourth exemplary embodiment. The eMMC write processing 1500 is performed by the main SoC 101 to write data to the eMMC 112. This processing is implemented by the CPU 102, the DMAC 105, and the controller 114 in a collaborative way. Referring to FIG. 15, elements similar to those illustrated in FIG. 11 are assigned the same reference numerals, and redundant descriptions thereof will be omitted. However, the processing illustrated in FIG. 15 differs from the processing illustrated in FIG. 11 in the processing in steps S1511 and S1513.

In step S403, the CPU 102 turns ON the enable register of the DMAC 105 to start the DMA transfer by the DMAC 105. Upon completion of step S403, the processing proceeds to step S1511.

In step S1511, the CPU 102 performs the count-up processing based on the contents of the descriptor table 500 generated in step S401. The processing in step S1511 corresponding to step S1112 illustrated in FIG. 11 is similar to the write data size count-up processing 1200 described above with reference to FIG. 12.

In step S411, the CPU 102 determines the type of the interrupt received in step S410. In a case where the CPU 102 determines that the type of the interrupt is an abnormal interrupt (NO in step S411), the processing proceeds to step S1513. Meanwhile, in a case where the CPU 102 determines that the type of the interrupt is not an abnormal interrupt (YES in step S411), the processing proceeds to step S1114.

In step S1513, the CPU 102 performs countdown processing on the data size having undergone the count-up processing in advance in step S1511. Step S1513 will be described in detail below with reference to FIG. 16.

In step S413, the CPU 102 performs a recovery operation such as retransfer and displays the abnormal condition on the UI 108. Step S413 is not directly related to the present disclosure, and a detailed description thereof will be omitted. Subsequent steps are similar to those illustrated in FIG. 11, and redundant descriptions thereof will be omitted.

Execution timings according to the present exemplary embodiment may be different from the execution timings of the actual write data size addition processing 1300 as described above with reference to FIGS. 14A to 14C according to the third exemplary embodiment. More specifically, the actual write data size addition processing 1300 may be performed in other than step S1115, for example, at the time of system shutdown, at the time of transition to the sleep state (power-saving state), and at fixed time intervals (each time a timer interrupt occurs).

Figure 16:
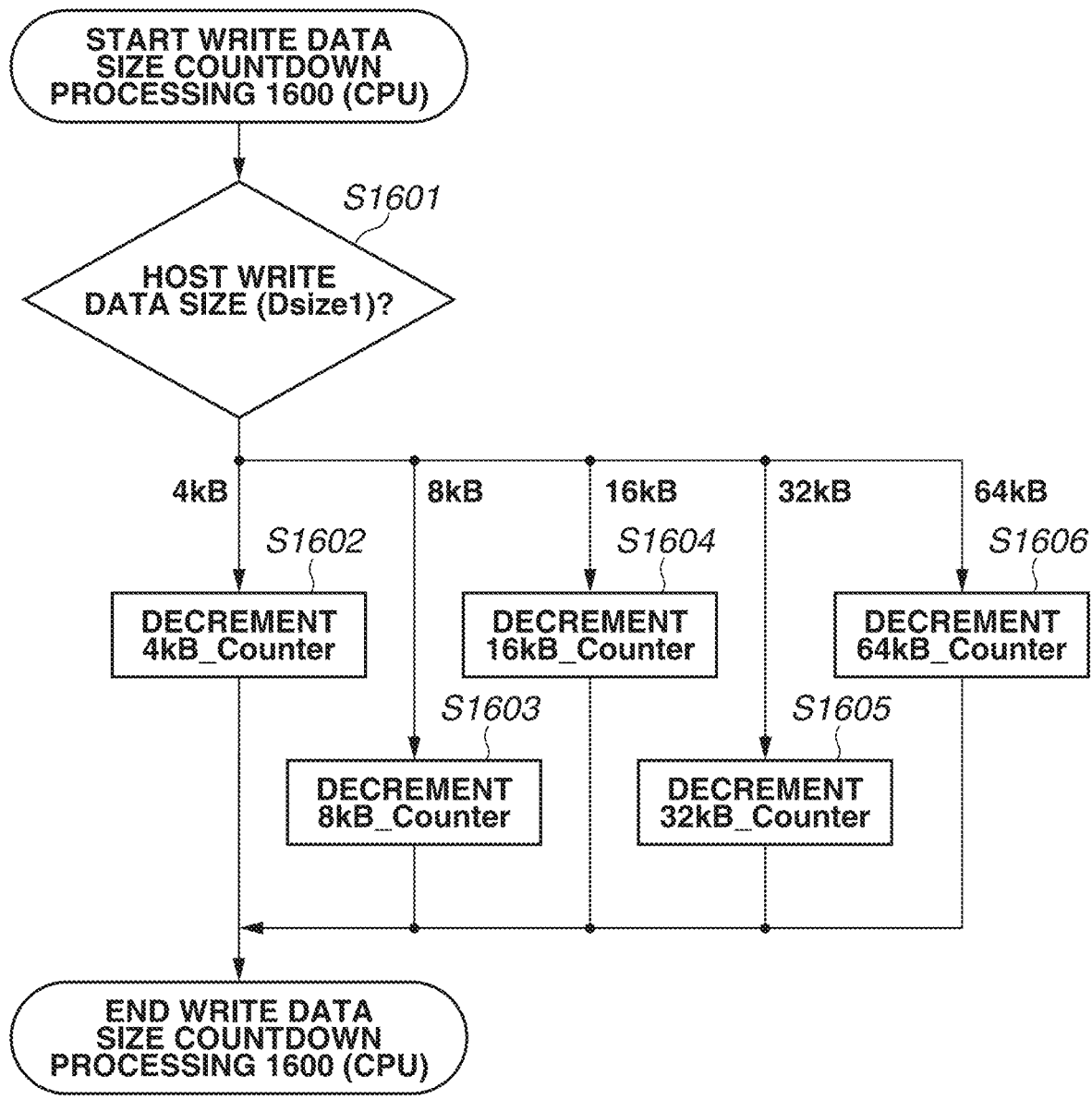
FIG. 16 is a flowchart illustrating write data size count-down processing according to the fourth exemplary embodiment.

FIG. 16 is a flowchart illustrating write data size countdown processing 1600 according to the fourth exemplary embodiment. The write data size countdown processing 1600 is performed by the CPU 102 in step S1513 in the eMMC write processing 1500.

In step S1601, the CPU 102 determines the counter to be decremented, based on the host write data size (Dsize1). The host write data size (Dsize1) can be determined based on the contents of the descriptor table 500 described above with reference to FIG. 5.

Step S1602 is performed when the host write data size (Dsize1) is determined to be 4K bytes in step S1601. In step S1602, the CPU 102 decrements 4 kB_Counter (counter for 4K bytes).

Step S1603 is performed when the host write data size (Dsize1) is determined to be 8K bytes in step S1601. In step S1603, the CPU 102 decrements 8 kB_Counter (counter for 8K bytes).

Step S1604 is performed when the host write data size (Dsize1) is determined to be 16K bytes in step S1601. In step S1604, the CPU 102 decrements 16 kB_Counter (counter for 16K bytes).

Step S1605 is performed when the host write data size (Dsize1) is determined to be 32K bytes in step S1601. In step S1605, the CPU 102 decrements 32 kB_Counter (counter for 32K bytes).

Step S1606 is performed when the host write data size (Dsize1) is determined to be 64K bytes in step S1601. In step S1606, the CPU 102 decrements 64 kB_Counter (counter for 64K bytes).

Although the present exemplary embodiment has been described above centering on an example where the counters for 4K to 64K bytes are prepared, counters for other data sizes may be prepared for counting.

According to the present exemplary embodiment, it becomes possible to select a suitable WAF according to the data size to be written to the eMMC 112 by the main SoC 101 and to calculate the actual write data size. In addition, the CPU 102 can perform the calculation of the actual write data size without waiting for completion of the DMA transfer. As a result, the host system can estimate the actual write data size more accurately than that in conventional cases, reducing the processing time overhead by the actual write data size calculation by the CPU 102.

According to the present exemplary embodiment, further, the CPU 102 performs the write data size count-up or countdown processing at the occurrence timing of the write processing for the eMMC 112, and calculates the actual write data at another timing by using the count value. As a result, it becomes possible to reduce the local concentration of the load on the CPU 102.

The present disclosure is implemented also by performing the following processing. More specifically, software (program) for implementing the functions of the above-described exemplary embodiments is supplied to a system or apparatus via a network or various types of storage media, and a computer (or CPU or micro processing unit (MPU)) of the system or apparatus reads and executes the program codes. In this case, the computer program and the storage medium storing the computer program are included in the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-025606, filed Feb. 15, 2019, which is hereby incorporated by reference herein in its entirety.

What is claimed is:

1. An information processing apparatus comprising: a nonvolatile semiconductor storage configured to store data; a memory that stores a factor for each data size; and
a controller having one or more processors which executes instructions stored in one or more memories that include the memory, the controller being configured to:
instruct the semiconductor storage to store a plurality of write data;
calculate a write data size of each of the plurality of write data;
totalize the calculated write data size of each of the plurality of write data;
issue a notification when the totalize write data size satisfies a predetermined condition in relation to a threshold value; and
count, for each data size individually, a number of times of write instruction for the data size of the plurality of write data instructed to be written in a normal power state, and totalize count values counted in the normal power state,
wherein, upon occurrence of a shift condition for transition from the normal power state to a power-saving state, in which power consumption is lower than in the normal power state,
based on the data size of the data instructed to be written, the factor corresponding to each of the data size of the plurality of write data instructed to be written, and the totalize count values;
the controller calculates a total write data size for the each of the plurality of write data sizes in the normal power state, and
the controller totalizes the total calculated write data size for the each of the plurality of write data sizes, and causes a value obtained by the totalizing to be stored.

2. The information processing apparatus according to claim 1, wherein the factor in a case of a first data size and the factor in a case of a second data size are set for a product name of the nonvolatile semiconductor storage.

3. The information processing apparatus according to claim 1, wherein the nonvolatile semiconductor storage stores, in association with a factor, a data size of each of plural pieces of the data instructed by the controller to be written.

4. The information processing apparatus according to claim 1, wherein the controller compares the totalized calculated write size with the threshold value, and wherein the controller issues the notification based on a result of the comparison.

5. The information processing apparatus according to claim 1, further comprising: a timer configured to count time;
wherein the controller is further configured to: receive an interrupt signal in a case where the time counted by the timer exceeds a first threshold; and count, based on receiving the interrupt signal, a number of times of write instruction for the data size of the data instructed to be written.

6. The information processing apparatus according to claim 1, wherein the notification indicates that a replacement of the semiconductor storage is required.

7. The information processing apparatus according to claim 1, wherein the notification is issued in response to the totalized total calculated write data size exceeding the threshold value.

8. The information processing apparatus according to claim 1, further comprising:
a display,
wherein the controller issues the notification by causing the display to display a message for prompting a user to replace the semiconductor storage.

9. The information processing apparatus according to claim 1, wherein the semiconductor storage is a nonvolatile NAND flash memory.

10. The information processing apparatus according to claim 1, further comprising:
an image processing circuit configured to process image data,
wherein the semiconductor storage stores the image data processed by the image processing circuit.

11. The information processing apparatus according to claim 10, further comprising a printer configured to form an image on a sheet based on the image data generated by the image processing circuit.

12. The information processing apparatus according to claim 1, wherein the factor corresponding to the data size of the data instructed to be written is not less than one.

13. The information processing apparatus according to claim 2, wherein, in a nonvolatile semiconductor storage different from the semiconductor storage, the factor in a case of the first data size is different from the factor in a case of the second data size.

14. The information processing apparatus according to claim 1,
wherein, based on the data size of the data instructed to be written, the factor corresponding to the data size of the data instructed to be written, and the number of times of write instruction, the controller calculates the write size for each data size individually, and
wherein the calculated write size of plural pieces of the data size are totalized.

15. The information processing apparatus according to claim 1,
wherein the controller calculates the write size at fixed time intervals.

16. The information processing apparatus according to claim 1,
wherein the controller calculates the write size when a predetermined condition is satisfied.

17. The information processing apparatus according to claim 1,
wherein, based on calculating a total write size for the each data size in the normal power state, the controller resets the count values.

18. A method for controlling an information processing apparatus comprising: a nonvolatile semiconductor storage configured to store data; and
a memory that stores a factor for each data size, wherein the control method comprises: instructing the semiconductor storage to store a plurality of write data;
calculating a write data size corresponding to a each of the plurality of write data sizes of the data instructed to be written;
totalizing the calculated write size of each of the plurality of write data;
issuing a notification in a case where the totalized write data size satisfies a predetermined condition in relation to a threshold value; and
counting, for each data size individually, a number of times of write instruction for the data size of the plurality of write data instructed to be written in a normal power state, and totalize count values counted in the normal power state,
wherein, upon occurrence of a shift condition for transition from the normal power state to a power-saving state, in which power consumption is lower than in the normal power state
based on the data size of the data instructed to be written, the factor corresponding to each of the data size of the plurality of write data instructed to be written, and the totalize count values, the controller calculates a total write data size for the each of the plurality of write data sizes in the normal power state, and
the controller totalizes the total calculated write data size for the each of the plurality of write data sizes, and causes a value obtained by the totalizing to be stored.

19. An information processing system comprising:
a display for displaying a notification on a display; and
an information processing apparatus including:
a nonvolatile semiconductor storage configured to store a plurality of write data;
a memory that stores a factor for each write data size; and
a controller having one or more processors which executes instructions stored in one or more memories that include the memory, the controller being configured to:
instruct the semiconductor storage to store a plurality of write data;
calculate a write data size corresponding to of each of the plurality of write data sizes of the data instructed to be written;
totalize the calculated write data size;
issue the notification in a case where the totalized write data size satisfies a predetermined condition in relation to a threshold value; and
count, for each data size individually, a number of times of write instruction for the data size of the plurality of write data instructed to be written in a normal power state, and totalize count values counted in the normal power state,
wherein, upon occurrence of a shift condition for transition from the normal power state to a power-saving state, in which power consumption is lower than in the normal power state,
based on the data size of the data instructed to be written, the factor corresponding to each of the data size of the plurality of write data instructed to be written, and the totalize count values,
the controller calculates a total write data size for the each of the plurality of write data sizes in the normal power state, and
the controller totalizes the total calculated write data size for the each of the plurality of write data sizes, and causes a value obtained by the totalizing to be stored.

20. The information processing system according to claim 19, wherein the factor corresponding to the data size of the data instructed to be written is not less than one.

21. The information processing system according to claim 19, wherein, in a nonvolatile semiconductor storage different from the semiconductor storage, the factor in a case of a first data size is different from the factor in a case of a second data size.

22. The information processing system according to claim 19,
   wherein, based on calculating a total write size for the each data size in the normal power state, the controller resets the count values.

* * * * *